US012659647B2

(12) United States Patent
Hosoi

(10) Patent No.: US 12,659,647 B2
(45) Date of Patent: Jun. 16, 2026

(54) HEARING DEVICE

(71) Applicant: FINEWELL CO., LTD., Osaka (JP)

(72) Inventor: Hiroshi Hosoi, Osaka (JP)

(73) Assignee: FINEWELL CO., LTD., Osaka (JP)

( * ) Notice: Subject to any disclaimer, the term of this patent is extended or adjusted under 35 U.S.C. 154(b) by 212 days.

(21) Appl. No.: 18/576,173

(22) PCT Filed: Jul. 12, 2023

(86) PCT No.: PCT/JP2023/025737
§ 371 (c)(1),
(2) Date: Jan. 3, 2024

(87) PCT Pub. No.: WO2024/018967
PCT Pub. Date: Jan. 25, 2024

(65) Prior Publication Data

US 2025/0097628 A1 Mar. 20, 2025

(30) Foreign Application Priority Data

Jul. 22, 2022 (JP) ................................ 2022-117491

(51) Int. Cl.
*H04R 1/24* (2006.01)
*H04R 1/10* (2006.01)
*H04R 25/00* (2006.01)

(52) U.S. Cl.
CPC ............... *H04R 1/24* (2013.01); *H04R 1/105* (2013.01); *H04R 25/606* (2013.01); *H04R 2460/13* (2013.01)

(58) Field of Classification Search
CPC ........ H04R 1/24; H04R 1/105; H04R 25/606; H04R 2460/13
See application file for complete search history.

(56) References Cited

U.S. PATENT DOCUMENTS

2019/0117508 A1* 4/2019 Kimura ................. H04R 1/105

FOREIGN PATENT DOCUMENTS

| | | |
|---|---|---|
| JP | 2007103989 A | 4/2007 |
| JP | 2008012093 A | 1/2008 |
| JP | 2018064237 A | 4/2018 |

OTHER PUBLICATIONS

International Search Report issued in corresponding International Application No. PCT/JP2023/025737, dated Sep. 19, 2023 (4 pages).
Written Opinion issued in corresponding International Application No. PCT/JP2023/025737, dated Sep. 19, 2023 (4 pages).

* cited by examiner

*Primary Examiner* — Suhan Ni
(74) *Attorney, Agent, or Firm* — Osha Bergman Watanabe & Burton LLP

(57) ABSTRACT

Provided is a hearing device having excellent added value by utilizing a novel application of cartilage conduction. The hearing device includes a vibrator configured to be attached in contact with an epidermis of an auricle; and a drive unit configured to drive and vibrate the vibrator, wherein the vibrator is configured to transmit sound to an inner ear and stimulates an ear acupuncture point by applying vibration to cartilage tissue surrounding an external auditory meatus.

11 Claims, 9 Drawing Sheets

HEARING DEVICE

TECHNICAL FIELD

The present disclosure relates to a hearing device. Priority is claimed based on Japanese Patent Application No. 2022-117491, filed on Jul. 22, 2022, the contents of which are incorporated herein by reference.

BACKGROUND ART

The applicant of the present application has proposed many hearing devices using cartilage conduction, and mobile phones, hearing aids, and the like using the same (see, for example, Patent Document 1).

CITATION LIST

Patent Literature

Patent Document 1: JP 2018-064237 A

SUMMARY OF INVENTION

Technical Problem

The inventor of the present application has found a novel application of cartilage conduction in addition to a hearing method using cartilage conduction.

An object of an aspect of the present disclosure is to provide a hearing device having excellent added value by utilizing a novel application of cartilage conduction.

Solution to Problem

A hearing device according to an aspect of the present disclosure includes a vibrator configured to be attached in contact with an epidermis of an auricle; and a drive unit configured to drive and vibrate the vibrator, wherein the vibrator is configured to transmit sound to an inner ear and stimulates an ear acupuncture point by applying vibration to cartilage tissue surrounding an external auditory meatus.

At least one protrusion is provided on a contact surface of the vibrator that comes into contact with the epidermis.

The at least one protrusion has a height protruding from the contact surface ranging from 0.1 mm to 3 mm.

The drive unit is configured to apply vibration from the vibrator which transmits audible sound to the cartilage tissue by supplying a first drive signal with a first frequency in an audible range to the vibrator, and to apply vibration from the vibrator which stimulates the ear acupuncture point by supplying a second drive signal with a second frequency lower than the first frequency to the vibrator.

The second frequency is an inaudible low frequency of 20 Hz or less.

The drive unit alternately supplies the first drive signal and the second drive signal to the vibrator.

The drive unit is configured to simultaneously supply the first drive signal and the second drive signal to the vibrator.

The vibrator includes a first vibrator configured to be attached in contact with the epidermis of the auricle and to apply vibration for transmitting audible sound to the cartilage tissue by vibrating at a first frequency in an audible range, and a second vibrator configured to be attached in contact with the epidermis and to apply vibration for stimulating the ear acupuncture point by vibrating at a second frequency lower than the first frequency.

A coupler connected to the first vibrator and the second vibrator is further comprised, wherein the coupler maintains a state in which one of the first vibrator and the second vibrator is attached to a tragus or a rear of auricle and the other is attached in a cavum conchae.

DESCRIPTION OF EMBODIMENTS

Figure 1:
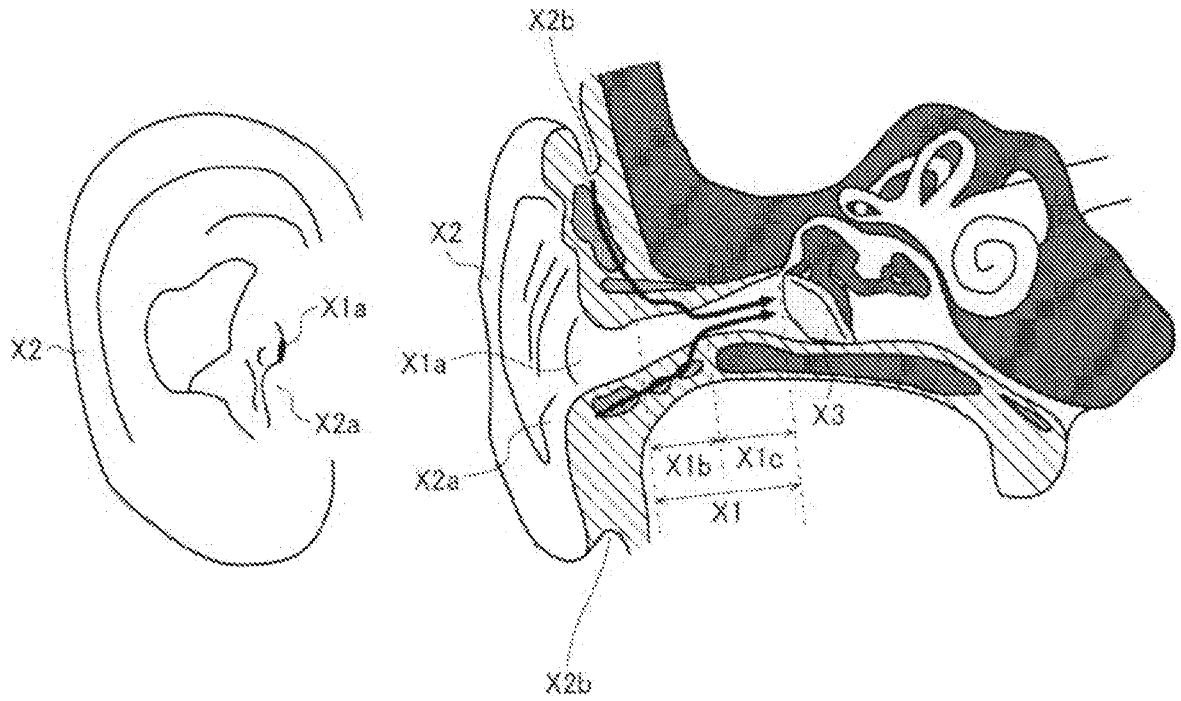
FIG. 1 is an anatomical diagram of an ear.

Embodiments of the present disclosure will be described below with reference to the drawings. In the drawings, the same or equivalent elements are given the same reference numeral, and redundant descriptions will be omitted.

Cartilage Conduction

Prior to describing the hearing device of the present application in detail, its hearing mechanism will first be described with reference to FIG. 1. FIG. 1 is an anatomical diagram of an ear. In FIG. 1, approximately half of an external auditory canal X1 on the side closer to an external auditory meatus X1*a* is a cartilage external auditory canal X1*b*. Approximately half of the external auditory canal X1 on the side closer to a tympanic membrane X3 is a mastoid process external auditory canal X1*c*.

The inventor of the present application, who is an otolaryngologist, has been a proponent of a mechanism for hearing sound that works as follows: when a vibrator is placed against the cartilage tissue of an auricle X2 that surrounds the external auditory meatus X1*a*, for example, the cartilage tissue near a tragus X2*a* or a rear of auricle X2*b* (in particular, near the external auditory meatus X1*a*), the vibration travels to the cartilage external auditory canal X1*b* and the air-conducted sound (in other words, the compression waves in the air caused by acoustic vibration) that emanates from an inner surface of the cartilage external auditory canal X1*b* reaches the tympanic membrane X3 via the mastoid process external auditory canal X1*c*, travels through the middle ear conductive system, and reaches the inner ear (see the thick solid line arrow in FIG. 1). The inventor of the present application was first in the world to discover this novel hearing mechanism, a third hearing mechanism that is neither air conduction nor bone conduction, calling it cartilage conduction and has proposed its use in mobile phones, hearing aids, and the like.

Unlike known bone conduction in which the heavy forehead bone or temporal bone is vibrated, with cartilage conduction, sound can be heard via vibration of the lighter tragus X2*a* or rear of auricle X2*b*. This allows the drive energy of the vibrator to be very small.

Known air conduction is a phenomenon whereby sound is heard by air-conducted sound entering from outside the external auditory meatus X1*a* vibrating the tympanic membrane X3. With cartilage conduction: however, a phenomenon is observed whereby, when the external auditory meatus X1*a* is closed by a finger or the like, acoustic energy inside the external auditory canal X1 increases and sound is heard louder (the so-called effect of external auditory canal atresia). Thus, by closing the external auditory meatus X1*a*, sound can be clearly heard even in an environment with a lot of surrounding noise.

Figure 2:
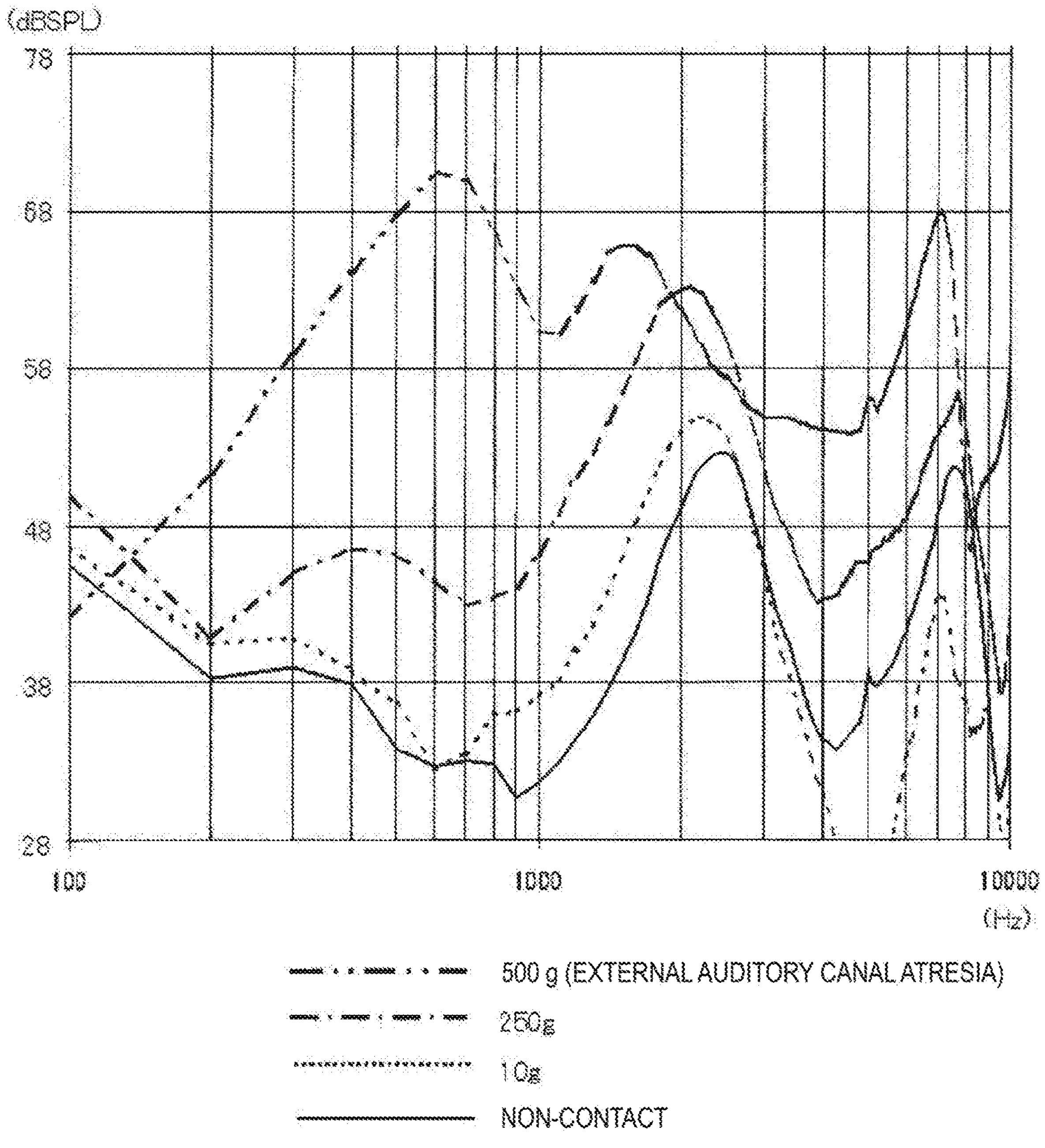
FIG. 2 is a graph showing an example of measured data showing the effect of cartilage conduction.

FIG. 2 is a graph showing an example of measured data showing the effect of cartilage conduction. The present graph shows the relationship between frequency and sound pressure inside the external auditory canal 1 cm back from the entrance portion of the external auditory canal when the outer wall surface of a vibrating vibrator is brought into contact with at least a part of the ear cartilage around the entrance portion of the external auditory canal without being brought into contact with the helix.

In the present graph, the vertical axis represents sound pressure (dBSPL), and the horizontal axis represents frequency (Hz) in a logarithmic scale. In the present graph, in order to show the effect the contact pressure between the outer wall surface of the vibrator and the ear cartilage around the entrance portion of the external auditory canal has on the sound pressure inside the external auditory canal, sound pressure in a non-contact state is represented by a solid line, sound pressure at 10 grams of contact pressure is represented by a dashed line, sound pressure at 250 grams of contact pressure is represented by a dot-dash line, and sound pressure in a state where the external auditory canal is closed by a further increase in contact pressure (500 grams of contact pressure) is represented by a two-dot dash line. In the non-contact state, only the air-conducted sound emanating from the outer wall surface of the vibrator is heard.

As illustrated in the diagram, the sound pressure increases when the state changes from the non-contact state to a contact state of 10 grams of contact pressure, further increases when the state further changes to a contact state of 250 grams of contact pressure, and further increases when the state further changes from this state to a contact state of 500 grams of contact pressure.

As is apparent from the present graph, when the outer wall surface of the vibrator is brought into contact with at least a part of the ear cartilage around the entrance portion of the external auditory canal without contacting the helix, the sound pressure inside the external auditory canal 1 cm back from the entrance portion of the external auditory canal increased by approximately 5 dB in a frequency band ranging from 900 Hz to 2000 Hz, compared to the non-contact state (compare the non-contact state indicated by the solid line and the state indicated by the dot-dash line).

Also, as is apparent from the present graph, when the outer wall surface of the vibrator is brought into contact with at least a part of the ear cartilage around the entrance portion of the external auditory canal without contacting the helix, the sound pressure inside the external auditory canal 1 cm back from the entrance portion of the external auditory canal increased by approximately 10 dB in a frequency band ranging from 500 Hz to 2300 Hz due to a change in contact pressure (compare the minimal contact state indicated by the dashed line and the contact state indicated by the dot-dash line).

As is clear from the foregoing, the required sound pressure is obtained by the vibration of the vibrator being transmitted to the ear cartilage via contact without an air-conducted sound generating mechanism (the vibration plate of a typical earphone, for example). Further, since sound is heard by bringing the vibrator into contact with the ear cartilage around the entrance portion of the external auditory canal, the sound from the vibrator can be heard and the sound of the outside world can be heard at the same time while keeping the external auditory canal open without closing, making comfortable wearing, free from a sense of the external auditory canal being blocked, possible.

Furthermore, as is clear from the present graph, when the outer wall surface of the vibrator is more strongly brought into contact with at least a part of the ear cartilage and the external auditory canal is closed, the sound pressure inside the external auditory canal 1 cm back from the entrance portion of the external auditory canal is increased by at least 20 dB in the main vocal frequency band (300 Hz to 1800 Hz), compared to the non-contact state. This indicates a large sound pressure enhancement effect caused by the effect of external auditory canal atresia (compare the non-contact state indicated by the solid line and the state where the external auditory canal is closed indicated by the two-dot dash line).

Note that the measurements in the present graph are all in a state where the output of the vibrator is not changed. For the measurements for the present graph taken in a state where the outer wall surface of the vibrator is brought into contact with at least part of the ear cartilage around the entrance portion of the external auditory canal without contacting the helix, the outer wall surface of the vibrator is brought into contact from outside the tragus. In addition, for the measurements for the present graph taken in a state where the external auditory canal is closed, the outer wall surface of the vibrator is pressed from outside the tragus and the tragus is folded to close the external auditory canal.

In addition, the present graph is merely an example, and upon further scrutiny, there are individual differences. In the present graph, measurement is performed in a state where the outer wall surface of the vibrator is brought into contact with only the outer side of the tragus in a small area in order to simplify and standardize the phenomenon.

However, the increase in sound pressure caused by contact is also dependent on the contact area with the ear cartilage, and when the outer wall surface of the vibrator is brought into contact with the ear cartilage around the entrance portion of the external auditory canal without contacting the helix, the increase in sound pressure is further increased with contact with ear cartilage portions that are broader than around the entrance portion of the external auditory canal. Taking this into consideration, the numerical values indicated in the present graph have generality in illustrating the configuration utilizing cartilage conduction and can be reproduced by many unspecified test subjects.

Further, although the present graph is based on pressing the tragus from the outside when closing the external auditory canal to increase the contact pressure and fold the tragus, a similar result can be obtained when the external auditory canal is closed by pressing the outer wall surface of the vibrator into the entrance portion of the external auditory canal.

Ear Acupuncture Points

Figure 3:
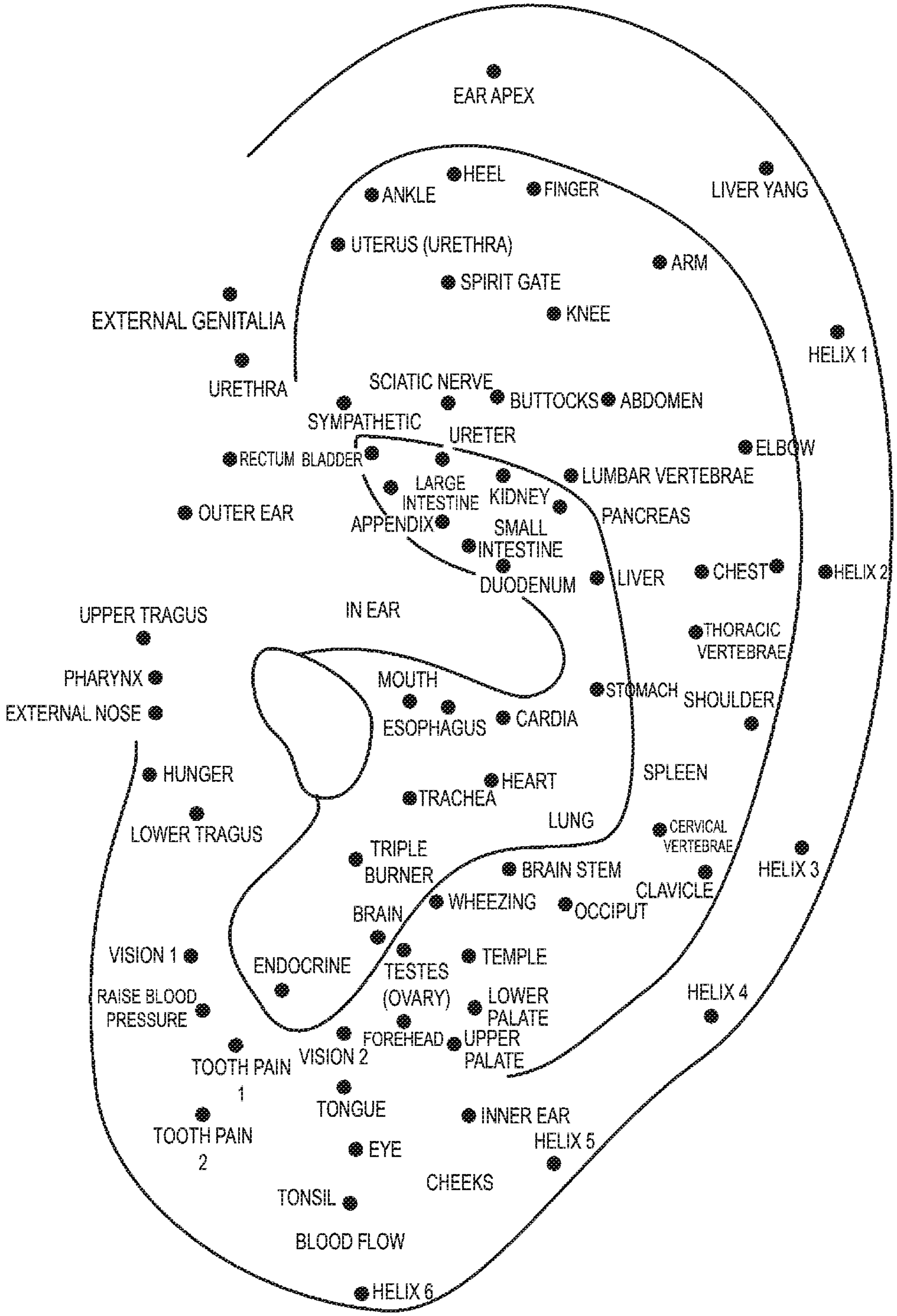
FIG. 3 is a diagram illustrating the positions of the ear acupuncture points.

The ear acupuncture points will now be described. FIG. 3 is a diagram illustrating the positions of the ear acupuncture points. Acupuncture points (so-called pressure points) are specific points on the body surface that can be stimulated by acupressure, acupuncture, or moxibustion to adjust physical conditions or relieve various symptoms. In particular, it is known that there are many ear acupuncture points (ear pressure points) in the auricle X2. As illustrated in FIG. 3, the cartilage tissue of the auricle X2 (for example, the cartilage tissue at or near the tragus X2*a* and the rear of auricle X2*b*) is located at or near ear acupuncture points.

Based on this positional relationship between the cartilage tissue of the auricle X2 and the ear acupuncture points, the inventor of the present application has found that vibration applied to the cartilage tissue of the auricle X2 by the vibrator can stimulate the ear acupuncture points at or near the cartilage tissue. As will be described below, the inventor of the present application has achieved a hearing device with excellent added value by using a novel application of cartilage conduction, the stimulation of car acupuncture points.

First Embodiment

Figure 4A:
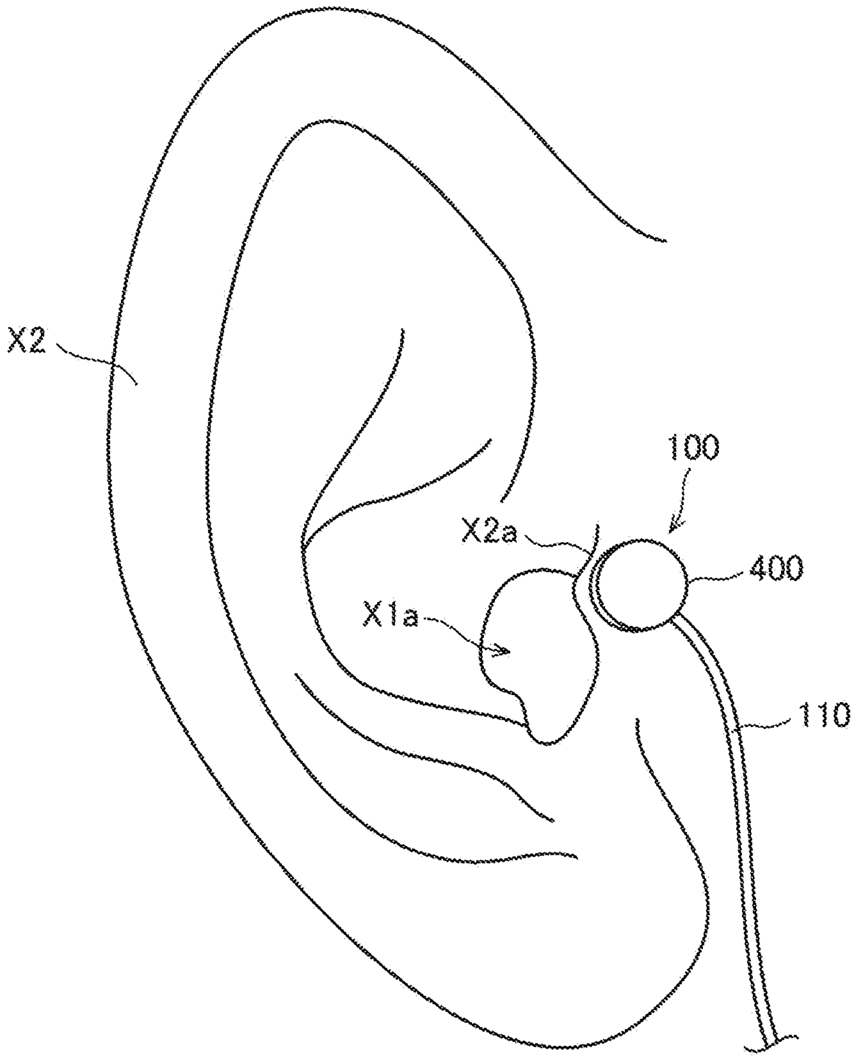
FIG. 4A is a view of an auricle with a hearing device according to a first embodiment attached as seen from the head side portion side.
Figure 4B:
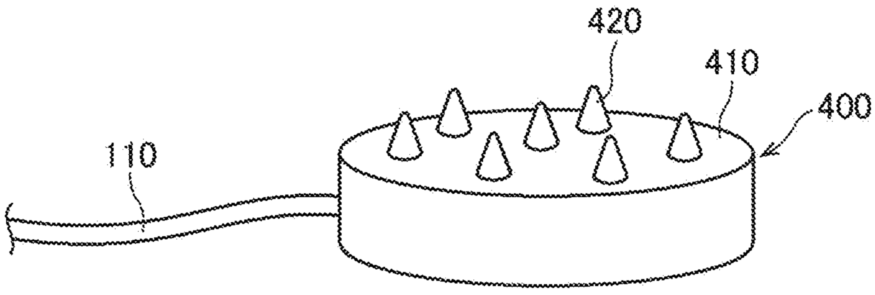
FIG. 4B is a perspective view of the hearing device according to the first embodiment.
Figure 5:
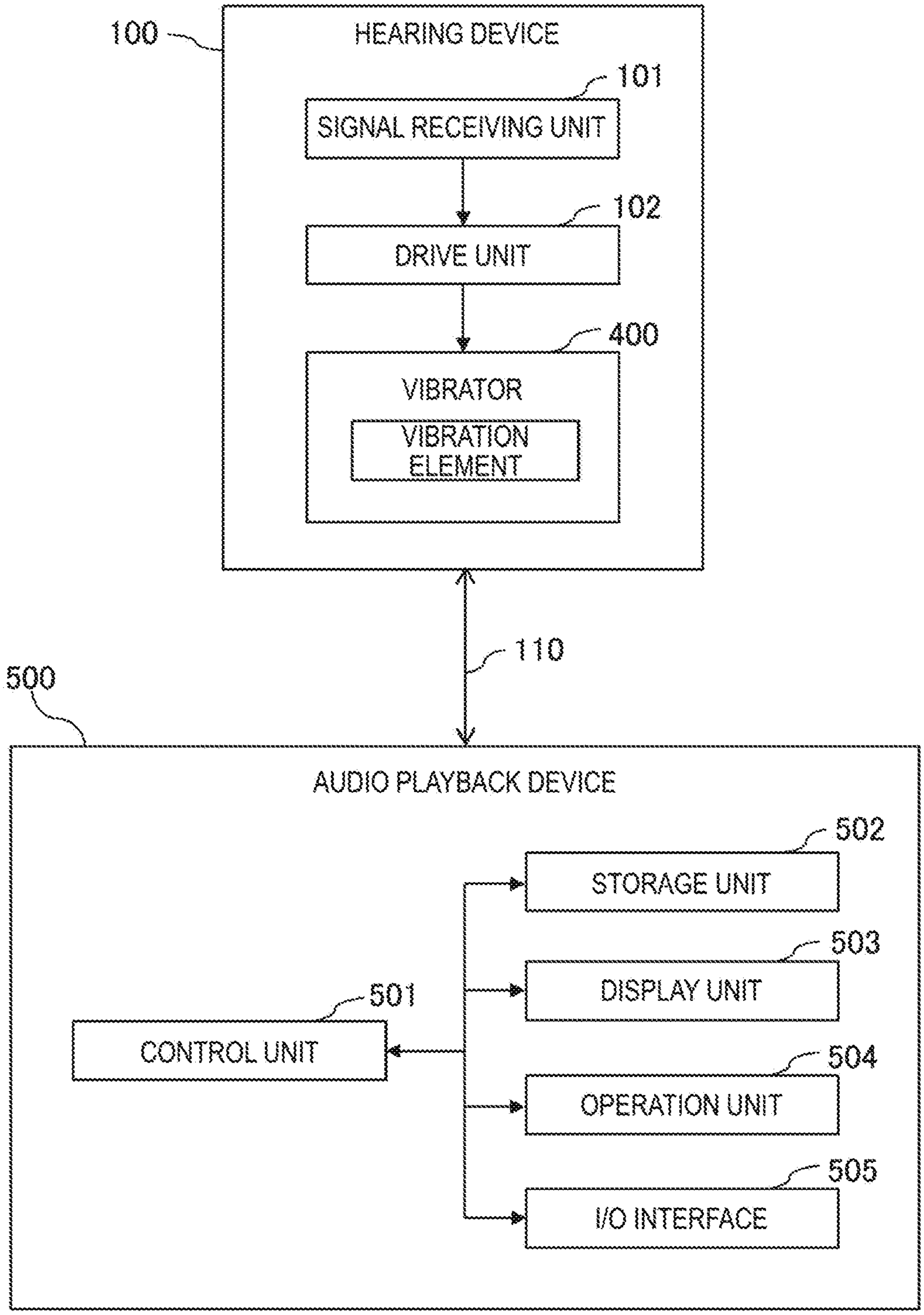
FIG. 5 is a block diagram illustrating the electrical configuration of the hearing device.

A hearing device 100 according to the first embodiment will now be described. FIG. 4A is a view of the auricle X2 with the hearing device 100 according to the first embodiment attached as seen from the head side portion side. FIG. 4B is a perspective view of the hearing device 100 according to the first embodiment. FIG. 5 is a block diagram illustrating the electrical configuration of the hearing device 100.

As illustrated in FIG. 4A, the hearing device 100 is attached to at least a part of the auricle X2 and is configured to conduct sound to the inner ear via cartilage conduction. The hearing device 100 can be used as an earphone of an audio playback device, a hearing aid, or a sound collector, for example. Examples of an audio playback device include a smartphone, a portable music player, and an audio recorder. In the example used in the present embodiment, the hearing device 100 is used as an earphone for an audio playback device 500.

The hearing device 100 includes a vibrator 400 attached in contact with the epidermis of the auricle X2. The vibrator 400 includes a built-in vibration element (for example, a piezoelectric element, an electromagnetic element, or the like) that vibrates in accordance with an audio signal. The vibrator 400 applies vibration to the cartilage tissue surrounding the external auditory meatus X1*a* to transmit sound to the inner ear and stimulate the car acupuncture points.

The vibrator 400 has a small, lightweight chip-like shape configured to be attached to a part of the epidermis of the auricle X2. As illustrated in FIG. 4B, one end surface of the circular shape of the vibrator 400 is a contact surface 410 that attaches to the epidermis of the auricle X2. The contact surface 410 is disposed at a position corresponding to at least one ear acupuncture point in the epidermis of the auricle X2.

The vibrator 400 of the present embodiment is formed in a shape and a size that allows it to be attached to the tragus X2*a*. For example, the vibrator 400 may have a disk shape with a small diameter, but a plate-like shape for easy attachment to the tragus X2*a* is sufficient. The vibrator 400 is attached using an adhesive or an adhesive sheet to bring the contact surface 410 into surface contact with the tragus X2*a*. The vibrator 400 may be attached to the tragus X2*a* by a fastener such as a clip. Also, the user may press the vibrator 400 against the tragus X2*a*. The user may pinch the vibrator 400 between their fingers and press it against the tragus X2*a* or may press the vibrator 400 provided in an external device against the tragus X2*a*. For example, the user may press the vibrator 400 against the tragus X2*a* by holding a mobile phone provided with the vibrator 400 up to the ear.

At least one protrusion 420 is provided on the contact surface 410 that comes into contact with the epidermis of the auricle X2. In the present embodiment, a plurality of (seven in the example in FIG. 4B) protrusions 420 are provided on the contact surface 410 at equal intervals. Each of the protrusion 420 has a conical shape with the same size, and the protruding end thereof is slightly rounded. The number, shape, size, and the like of the protrusions 420 can be freely designed. The protruding end of the protrusion 420 may be sharp. Further, the shape and size of the protruding end of the protrusions 420 may not all be uniform and may be different.

At least one protrusion 420 presses against the epidermis of the auricle X2 where the vibrator 400 is attached by point contact to stimulate an ear acupuncture point at or near that point. In this embodiment, the plurality of protrusions 420 stimulate car acupuncture points at the tragus X2*a* in surface contact with the contact surface 410. The at least one protrusion 420 has a height protruding from the contact surface 410 in a range (for example, from 0.1 mm to 3 mm) suitable for effectively stimulating the ear acupuncture point. In addition, since vibration of the entire vibrator 400 can be transmitted to the ear acupuncture point without using the protrusion 420, an embodiment without the protrusion 420 is also possible.

In addition to the above-described vibration element, a logic circuit (hardware) formed in an integrated circuit or the like is provided inside the vibrator 400. As illustrated in FIG. 5, the logic circuit provided in the vibrator 400 includes a signal receiving unit 101, a drive unit 102, a power supply unit, and the like. The signal receiving unit 101 receives an audio signal generated by an external sound source and outputs the received signal to the drive unit 102. The drive unit 102 drives and vibrates the vibrator 400. Specifically, the drive unit 102 executes predetermined signal processing (for example, amplification processing, waveform shaping processing, and the like) on the received signal to generate a drive signal, and supplies the drive signal to the vibration element of the vibrator 400 to vibrate the vibration element.

The power supply unit of the vibrator 400 supplies the power of a built-in battery to each unit of the vibrator 400. The power supply unit of the vibrator 400 may supply the power of an external power supply connected by a cable to each unit of the vibrator 400. Power may be supplied from a power supply unit of an external device (for example, the audio playback device 500) to the vibrator 400, without providing the power supply unit in the vibrator 400. The signal receiving unit 101, the drive unit 102, the power supply unit, and the like may be provided outside the vibrator 400 and electrically connected to the vibrator 400 by a cable.

In the present embodiment, the hearing device 100 is connected to the audio playback device 500, an external sound source, via a cable 110. The hearing device 100 and the audio playback device 500 may be connected by wireless communication. The audio playback device 500 is, for example, a portable music player and includes a control unit 501, a storage unit 502, a display unit 503, an operation unit 504, an I/O interface 505, and the like.

The control unit 501 is configured by a processor such as a central processing unit (CPU), but may be configured by a logic circuit (hardware). The storage unit 502 is a storage device such as a random access memory (RAM), a hard disk drive (HDD), or a flash memory. The storage unit 502 stores programs, data, and the like used by the audio playback device 500 and also stores audio data (for example, music data, speed data, and the like) that can be output as audio by the hearing device 100.

The display unit 503 can display various images and is a liquid crystal display, for example. The operation unit 504 can accept various operations by a user and is a key or a button, for example. The I/O interface 505 is an interface for transmitting/receiving data with an external device. For example, when the I/O interface 505 receives audio data transferred from an external computer, the control unit 501 stores the audio data in the storage unit 502.

The user uses the operation unit 504 to select the audio data they wish to reproduce as audio on the hearing device 100 from among the audio data displayed on the display unit 503. The control unit 501 reads out the selected audio data from the storage unit 502 and transmits the audio data from the I/O interface 505 to the hearing device 100. In this manner, the audio data selected by the user is reproduced as audio by cartilage conduction in the hearing device 100.

In the present embodiment, the audio data reproduced by the hearing device 100 includes audible data output in the audible range (20 Hz to 20 kHz) and inaudible data output in a low-frequency inaudible range (20 Hz or less). In the hearing device 100, the vibrator 400 attached to the tragus X2*a* vibrates the cartilage tissue at or near the external auditory meatus X1*a* at a frequency in the audible range on the basis of the audible data included in the audio data. In this case, since the audible sound is transmitted to the inner ear by cartilage conduction, the user can perceive the audio of the audible data. Since the vibrator 400 does not block the external auditory meatus X1*a*, the user can hear the air-conducted sound coming from the outside of the external auditory meatus X1*a* while also hearing the audio transmitted by cartilage conduction.

On the other hand, in the hearing device 100, the vibrator 400 vibrates the cartilage tissue at or near the external auditory meatus X1*a* at an inaudible low frequency on the basis of the inaudible data included in the audio data. In this case, since the ultra-low frequency sound is transmitted to the inner ear, the user cannot perceive the audio of the inaudible data. However, since the low-frequency vibration of the vibrator 400 is applied to the cartilage tissue, the ear acupuncture points (in particular, an ear acupuncture point located at the tragus X2*a*) at or near the cartilage tissue can be physically stimulated. Furthermore, since the protrusion 420 presses the ear acupuncture point together with the vibration of the vibrator 400, the effect of stimulating the ear acupuncture point is enhanced. Note that it should be obvious that even when the vibrator 400 is not provided with the protrusion 420, the ear acupuncture point can be physically stimulated by the vibration of the vibrator 400 as described above.

Driving modes of the hearing device 100 will now be described. The drive unit 102 of the hearing device 100 supplies a first drive signal having a first frequency within the audible range (20 Hz to 20 kHz) to the vibrator 400. This applies vibration from the vibrator 400 to the cartilage tissue for transmitting audible sound to the cartilage tissue. The drive unit 102 supplies a second drive signal having a second frequency lower than the first frequency to the vibrator 400. This applies vibration from the vibrator 400 for stimulating the car acupuncture point. The second frequency in the present example is an inaudible low frequency of 20 Hz or less but may be a frequency higher than 20 Hz.

Figure 6A:
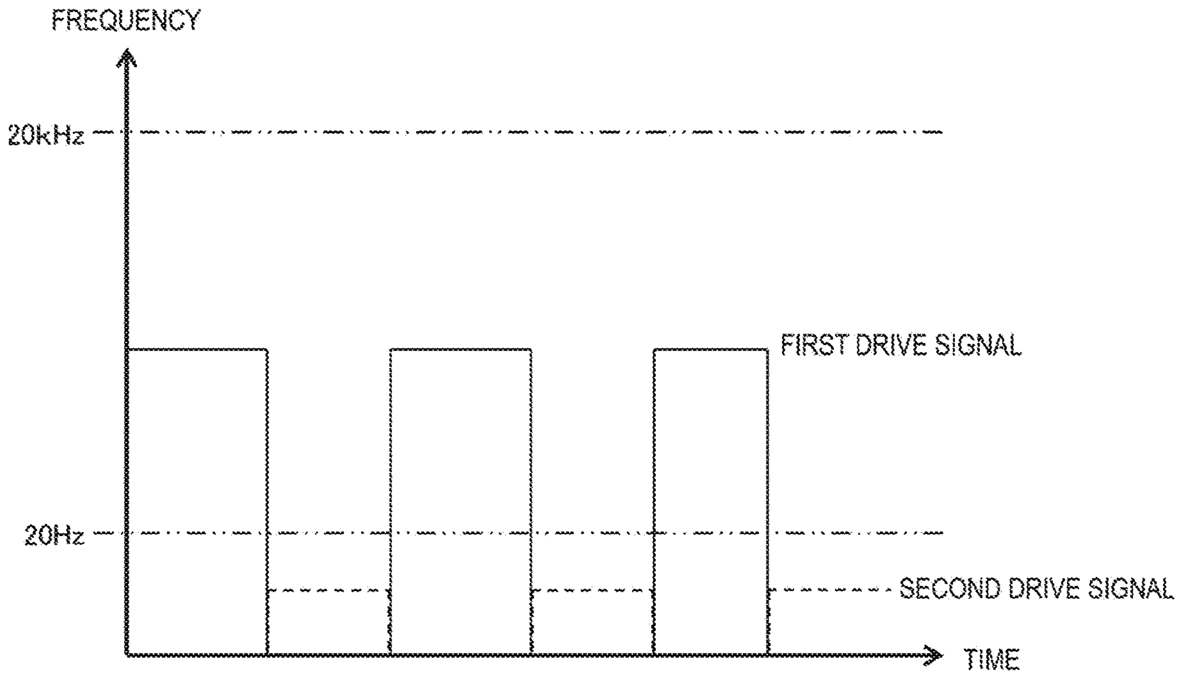
FIG. 6A is a graph showing a drive signal pattern of a first example.
Figure 6B:
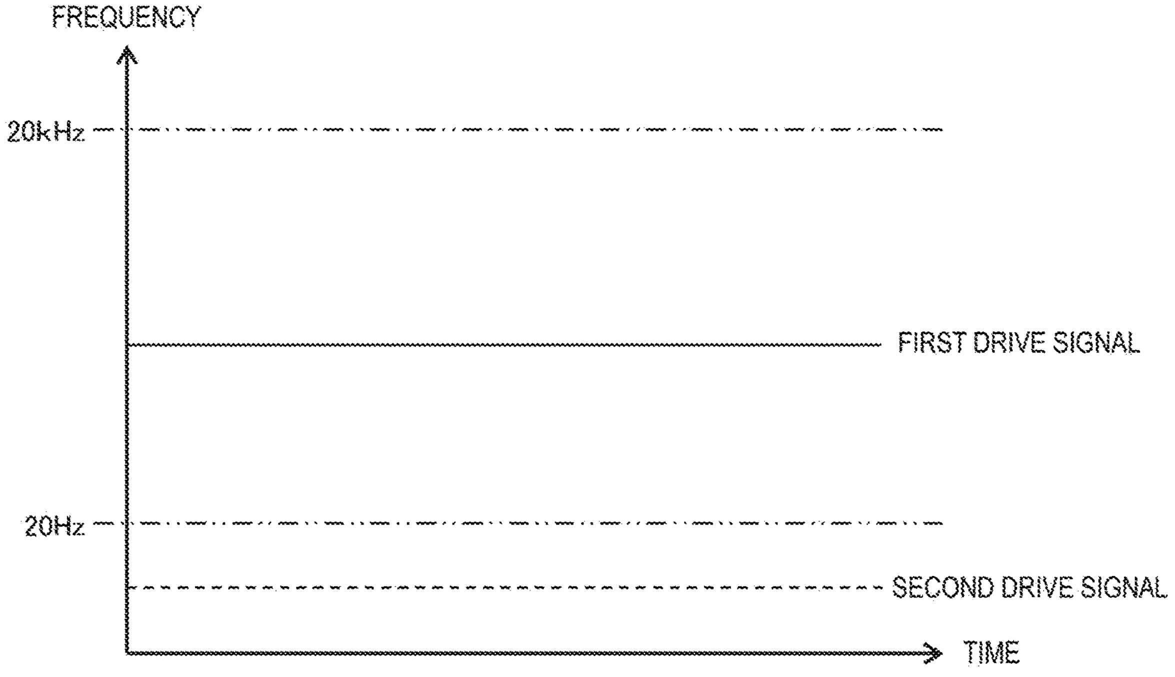
FIG. 6B is a graph showing a drive signal pattern of a second example.

Specific examples of such driving modes will be described below. FIG. 6A is a graph showing a drive signal pattern of a first example. FIG. 6B is a graph showing a drive signal pattern of a second example. In the graphs of FIGS. 6A and 6B, the horizontal axis represents the passage of time, and the vertical axis represents the ON/OFF states of the drive signals and the frequency of the drive signal when ON. In the following first and second examples, the vibrator 400 includes one vibration element.

The first example of a driving mode of the hearing device 100 will now be described with reference to FIG. 6A. In the first example, audible data and inaudible data are set alternately arranged in a time series in the audio data reproduced by the hearing device 100. As shown in FIG. 6A, the drive unit 102 alternately supplies the vibrator 400 with the first drive signal generated on the basis of the audible data received signal and the second drive signal generated on the basis of the inaudible data received signal.

In this case, during the ON period in which the first drive signal is supplied, the vibrator 400 vibrates at a frequency in the audible range (20 Hz to 20 kHz). Thus, the user can hear the audio of the audible data reproduced by cartilage conduction. In the example in FIG. 6A, for the sake of convenience, the frequency of the first drive signal is constant, but the frequency of the first drive signal varies within the audible range in accordance with the audio of the audible data.

On the other hand, during the ON period in which the second drive signal is supplied, the vibrator 400 vibrates at a low frequency in the inaudible range (20 Hz or less). Thus, the user cannot hear the audio of the inaudible data reproduced by cartilage conduction, but the low-frequency vibration of the vibrator 400 is applied to the cartilage tissue to stimulate the ear acupuncture point. In the example in FIG. 6A, the frequency of the second drive signal is a fixed value (for example, 10 Hz).

As described above, in the driving mode of the first example, reproduction of audible sound and stimulation of an ear acupuncture point are alternately performed utilizing cartilage conduction. Furthermore, in the present embodiment, the ON time of each second drive signal is set to an extremely short time (for example, 0.5 seconds or less). In the example in FIG. 6A, the first drive signal with an ON time of 0.1 seconds and the second drive signal with an ON time of 0.1 seconds are alternately supplied to the vibrator 400. By making the ON time of the second drive signal extremely short, the time during which audio reproduction of audible data based on the first drive signal is interrupted can be shortened. This makes it difficult for the user to perceive the interruption of the reproduction of the audible sound, allowing the user to receive ear acupuncture point stimulation while listening to the audio or music of the audible sound.

The second example of a driving mode of the hearing device 100 will now be described with reference to FIG. 6B. In the second example, the audible data and the inaudible data are simultaneously output to the audio data reproduced by the hearing device 100, and the inaudible data is set to be continuously output. As shown in FIG. 6B, the drive unit 102 simultaneously supplies the vibrator 400 with the first drive signal generated on the basis of the audible data received signal and the second drive signal generated on the basis of the inaudible data received signal.

In this case, the first drive signal and the second drive signal are simultaneously ON in parallel, and the vibrator 400 vibrates at a frequency in the audible range (20 Hz to 20 kHz) in the audible range and vibrates at a low frequency in the inaudible range (20 Hz or less). The user can hear the audio of the audible data reproduced by cartilage conduction, and the low-frequency vibration of the vibrator 400 is applied to the cartilage tissue to stimulate the ear acupuncture point. In this manner, in the driving mode of the second example, reproduction of audible sound and stimulation of an car acupuncture point are simultaneously performed utilizing cartilage conduction. In the present example described above, both the audible data and the inaudible data are continuously output. However, the audio data may have a period in which the audible data is output and a period in which the audible data is not output. In the audio data, the inaudible data is continuously output regardless of whether or not the period is a period in which the audible data is output. Thus, in a period in which the audible data is output, the ear acupuncture point is stimulated while the audible sound is reproduced in the same manner as described above, and in a period in which the audible data is not output, the ear acupuncture point is stimulated without the audible sound being reproduced.

The ON time of the first drive signal and the second drive signal can be freely set. In the first example, the ON time of the first drive signal may be longer than the ON time of the second drive signal. For example, the drive unit 102 may alternately supply a first drive signal with an ON time of 5 seconds and a second drive signal having an ON time of 0.2 seconds to the vibrator 400. The vibrator 400 may include a plurality of vibration elements instead of including a single vibration element. In this case, the plurality of vibration elements may be capable of simultaneously generating vibrations of a plurality of different frequencies. For example, the vibrator 400 may separately include a vibration element driven by the first drive signal and a vibration element driven by the second drive signal.

The audio data reproduced by the hearing device 100 may include only one of audible data and inaudible data. For example, audio data including only audible data can be used to reproduce audible sound without stimulation of an car acupuncture point. Since the audio data including only the audible data has the effect of vibrating the vibrator 400, it is possible to stimulate the ear acupuncture point with this vibration. Also, audio data including only inaudible data can be used to stimulate an ear acupuncture point without audible sound being reproduced.

Second Embodiment

Figure 7A:
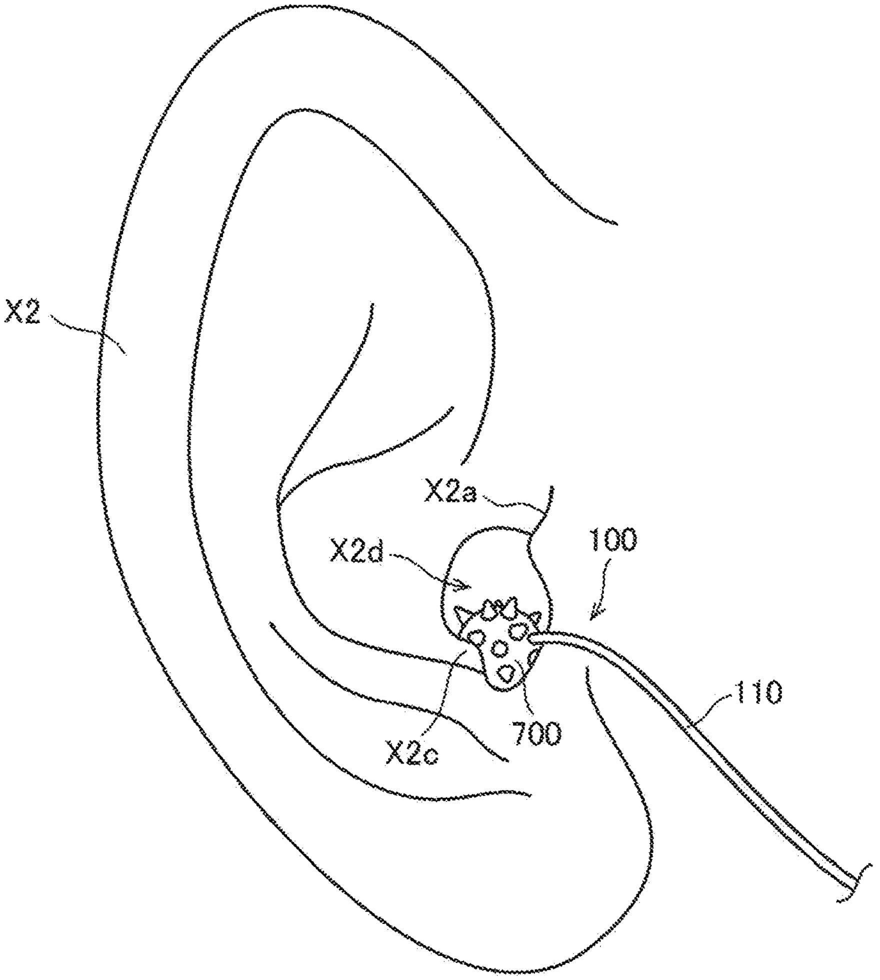
FIG. 7A is a view of the auricle with a hearing device according to a second embodiment attached as seen from the head side portion side.
Figure 7B:
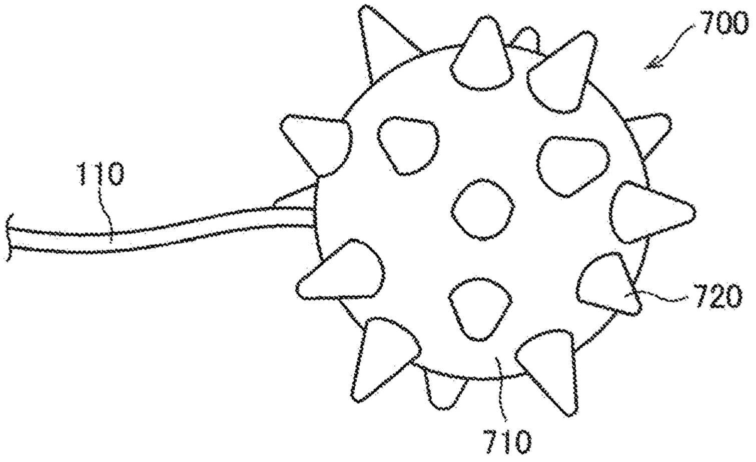
FIG. 7B is a perspective view of the hearing device according to the second embodiment.

The hearing device 100 according to the second embodiment will now be described. FIG. 7A is a view of the auricle X2 with the hearing device 100 according to the second embodiment attached as seen from the head side portion side. FIG. 7B is a perspective view of the hearing device 100 according to the second embodiment. In each of the following embodiments, components shared with the first embodiment are given the same reference numeral as in the first embodiment, and description thereof will be omitted. Differences from the first embodiment will be mainly described. The hearing device 100 according to the second embodiment is different from that of the first embodiment in terms of the shape and the attachment position of the vibrator.

As illustrated in FIGS. 7A and 7B, the hearing device 100 according to the second embodiment includes a vibrator 700 instead of the vibrator 400 of the first embodiment. The vibrator 700 includes a built-in vibration element and has a small, light-weight spherical shape configured to be attached to a part of the epidermis of the auricle X2. The outer surface of the vibrator 700 is a contact surface 710 that is attached to the epidermis of the auricle X2. The contact surface 710 is disposed at a position corresponding to at least one ear acupuncture point in the epidermis of the auricle X2.

The vibrator 700 according to the present embodiment is formed in a shape and a size that allows it to fit in an incisura intertragica X2*d*. The incisura intertragica X2*d* is located at the lower portion of the cavum conchae between the tragus X2*a* and an antitragus X2*c*. For example, the vibrator 700 has a spherical shape with a small diameter, but a three-dimensional shape (a prolate spheroid, oblate spheroid, hemispheroid, prolate hemispheroid, oblate semispheroid, cylindrical with a rounded edge, or the like) that easily fits in the incisura intertragica X2*d* is sufficient. When the vibrator 700 is fit into the incisura intertragica X2*d*, a part of the contact surface 710 comes into surface contact with the incisura intertragica X2*d*.

At least one protrusion 720 is provided on the contact surface 710 that comes into contact with the epidermis of the auricle X2. The protrusion 720 presses against the epidermis of the auricle X2 where the vibrator 700 is attached by point contact to stimulate an ear acupuncture point at or near that point. In the present embodiment, the plurality of protrusions 720 provided at equal intervals on the contact surface 710 stimulate the ear acupuncture points at the incisura intertragica X2*d* in surface contact with the contact surface 710. The height of each protrusion 720 protruding from the contact surface 710 is in a range (for example, from 0.1 mm to 3 mm) suitable for effectively stimulating the car acupuncture point.

The hearing device 100 according to the second embodiment is similar to that of the first embodiment except for the above-described difference in the vibrator. The driving mode of the hearing device 100 is also similar to that of the first embodiment. In the hearing device 100, the vibrator 700 attached to the incisura intertragica X2*d* vibrates the cartilage tissue at or near the external auditory meatus X1*a* at a frequency in the audible range on the basis of the audible data included in the audio data. This allows the user to perceive the audio of the audible data. Since the vibrator 700 does not block the external auditory meatus X1*a*, the user can hear the air-conducted sound coming from the outside of the external auditory meatus X1*a* while also hearing the audio transmitted by cartilage conduction.

On the other hand, in the hearing device 100, the vibrator 700 vibrates the cartilage tissue at or near the external auditory meatus X1*a* at an inaudible low frequency on the basis of the inaudible data included in the audio data. Thus, the user cannot perceive the audio of the inaudible data. Since the low-frequency vibration of the vibrator 700 is applied to the cartilage tissue, the ear acupuncture points (in particular, an ear acupuncture point located at the incisura intertragica X2*d*) at or near the cartilage tissue can be physically stimulated. Furthermore, since the protrusion 720 presses the ear acupuncture point together with the vibration of the vibrator 700, the effect of stimulating the ear acupuncture point is enhanced. Note that the number, shape, size, and the like of the protrusion 720 can be freely designed, and it should be obvious that even when the vibrator 700 is not provided with the protrusion 720, the ear acupuncture point can obviously be physically stimulated by the vibration of the vibrator 700 as described above.

Third Embodiment

Figure 8:
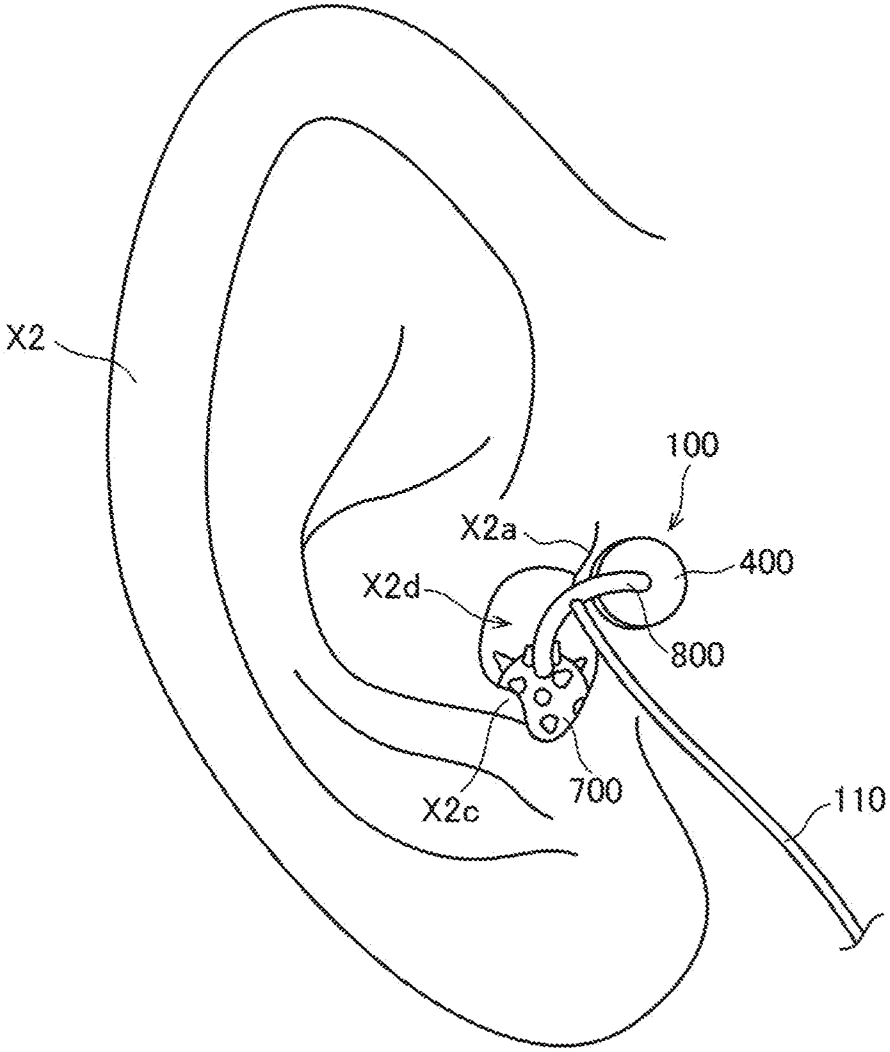
FIG. 8 is a view of the auricle with a hearing device according to a third embodiment attached as seen from the head side portion side.
Figure 9:
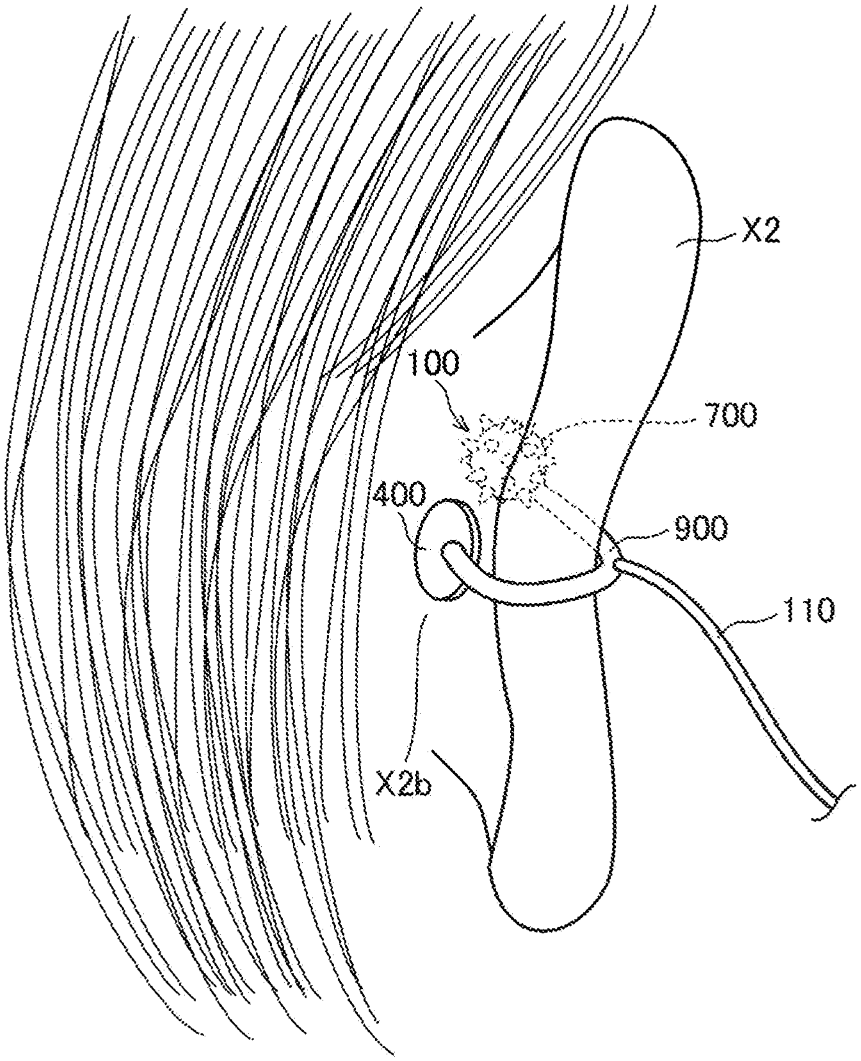
FIG. 9 is a view of the auricle with another hearing device according to the third embodiment attached as seen from the head back portion side.

The hearing device 100 according to the third embodiment will now be described. FIG. 8 is a view of the auricle X2 with the hearing device 100 according to the third embodiment attached as seen from the head side portion side. FIG. 9 is a view of the auricle X2 with a different hearing device 100 according to the third embodiment attached as seen from the head back portion side. The hearing device 100 according to the third embodiment is different from those of the first and second embodiments in that the hearing device 100 includes a plurality of vibrators.

The hearing device 100 according to the third embodiment includes a first vibrator for sound transmission and a second vibrator for ear acupuncture point stimulation. The first vibrator is attached in contact with the epidermis of the auricle X2 and vibrates at a first frequency within the audible range to apply vibration for transmitting audible sound to the cartilage tissue. The second vibrator is attached in contact with the epidermis of the auricle X2 and vibrates at a second frequency lower than the first frequency to apply vibration for stimulating the ear acupuncture point. As illustrated in FIG. 8, the first vibrator of the present example is similar to the vibrator 400 of the first embodiment, and the second vibrator of the present example is similar to the vibrator 700 of the second embodiment.

The hearing device 100 according to the third embodiment further includes a coupler 800 connected to the first vibrator and the second vibrator. As illustrated in FIG. 8, the coupler 800 of the present example is a flexible member curved in a substantially U-shape, and the vibrator 400 and the vibrator 700 are connected to both ends of the coupler 800 in the longitudinal direction. The coupler 800 supports the vibrator 400 and the vibrator 700 in a state where the contact surface 410 of the vibrator 400 faces toward the vibrator 700.

The coupler 800 maintains a state in which one of the first vibrator and the second vibrator is attached to the tragus X2*a* or the rear of auricle X2*b* and the other is attached in the cavum conchae. In the example illustrated in FIG. 8, the vibrator 400 is attached to the tragus X2*a*, and the vibrator 700 is attached in the incisura intertragica X2*d* at the lower portion of the cavum conchae. The coupler 800 extends between the vibrator 400 and the vibrator 700, bending around the outside of the tragus X2*a*. The coupler 800 is elastically biased in a direction that brings the vibrator 400 and the vibrator 700 closer together. Thus, the vibrator 400 and the vibrator 700 are fixed in a state of sandwiching the tragus X2*a* from both the front and the rear side.

The audio playback device 500 transmits audio data to the vibrator 400 and the vibrator 700 via the cable 110 connected to the coupler 800. In the present example, audio data including only audible data (hereinafter, sound output data) is transmitted to the vibrator 400, and audio data including only inaudible data (hereinafter, vibration output data) is transmitted to the vibrator 700.

In this manner, the vibrator 400 attached to the tragus X2*a* vibrates the cartilage tissue at or near the external auditory meatus X1*a* at a frequency in the audible range. This allows the user to perceive the audio of the audible data. In addition, since the vibrator 700 attached in the incisura intertragica X2*d* vibrates the cartilage tissue at or near the external auditory meatus X1*a* at inaudible low frequency, the ear acupuncture points (in particular, an ear acupuncture point located at the incisura intertragica X2*d*) at or near the cartilage tissue can be physically stimulated.

Note that the attachment positions of the first vibrator and the second vibrator are not limited to the mode described above. In the hearing device 100 illustrated in FIG. 9, the vibrator 400 is not attached to the tragus X2*a* but to the rear of auricle X2*b* (in particular, at or near the external auditory meatus X1*a*). The vibrator 700 is attached in the incisura intertragica X2*d* as in FIG. 8. A coupler 900 connected to the vibrator 400 and the vibrator 700 extends bending around the outside of the helix. The coupler 900 is elastically biased in a direction that brings the vibrator 400 and the vibrator 700 closer together. Thus, the vibrator 400 and the vibrator 700 are fixed in a state of sandwiching the auricle X2 from both the front and the rear side.

As described above, the audio playback device 500 transmits the sound output data to the vibrator 400 and transmits the vibration output data to the vibrator 700. In this manner, the vibrator 400 attached to the rear of auricle X2*b* vibrates the cartilage tissue at or near the external auditory meatus X1*a* at a frequency in the audible range. This allows the user to perceive the audio of the audible data. In addition, since the vibrator 700 attached in the incisura intertragica X2*d* vibrates the cartilage tissue at or near the external auditory meatus X1*a* at inaudible low frequency, the ear acupuncture points (in particular, an ear acupuncture point located at the incisura intertragica X2*d*) at or near the cartilage tissue can be physically stimulated.

Note that conversely, the audio playback device 500 may transmit the sound output data to the vibrator 700 and transmit the vibration output data to the vibrator 400. In this case, the ear acupuncture point can be physically stimulated by the vibrator 400 attached to the tragus X2*a* or the rear of auricle X2*b* while the audible data is reproduced by the vibrator 700. Also, the audio playback device 500 may transmit shared audio data including both audible data and inaudible data to both the vibrator 400 and the vibrator 700. In this case, both the vibrator 400 and the vibrator 700 can reproduce the audible sound and stimulate the ear acupuncture point.

Remarks

The present disclosure is not limited to the above-described embodiments, and various changes can be made within the scope of the claims. Embodiments obtained by appropriately combining techniques disclosed in different embodiments are also included in the technical scope of the present disclosure. Further, by combining the techniques disclosed in the different embodiments, novel technical advantages can be formed.

For example, the hearing device 100 may include three or more vibrators. The vibrator 400, 700 may not be provided with the protrusion 420, 720. The hearing device 100 may have the function of the audio playback device 500. In this case, the hearing device 100 can reproduce audible sound by cartilage conduction and stimulate an car acupuncture point by vibrating the vibrator on the basis of audio data stored in the hearing device 100.

The invention claimed is:

1. A hearing device comprising:

a vibrator configured to be attached in contact with an epidermis of an auricle; and a drive unit configured to drive and vibrate the vibrator, wherein the vibrator is configured to be attached to an epidermal position apart from an external auditory meatus such that the attached vibrator does not overlap the external auditory meatus when the auricle is viewed from a head side portion, and the vibrator is configured to transmit sound from the epidermal position to an inner ear and stimulate an ear acupuncture point by applying vibration to cartilage tissue surrounding the external auditory meatus.

2. The hearing device according to claim 1, wherein protrusions are disposed on a contact surface of the vibrator that contacts the epidermis.

3. The hearing device according to claim 2, wherein each of the protrusions has a height protruding from the contact surface ranging from 0.1 mm to 3 mm.

4. The hearing device according to claim 1, wherein the vibrator is configured to be attached to the epidermal position such that a part of the auricle is positioned between the vibrator and the external auditory meatus.

5. The hearing device according to claim 1, wherein the vibrator is configured to be attached to the epidermis of a tragus or the epidermis of a rear portion of the auricle.

6. A hearing device comprising:

a vibrator configured to be attached in contact with an epidermis of an auricle; and a drive unit configured to drive and vibrate the vibrator, wherein the vibrator is configured to transmit sound to an inner ear and stimulate an ear acupuncture point by applying vibration to cartilage tissue surrounding an external auditory meatus, and the drive unit is configured to:

apply vibration from the vibrator which transmits audible sound to the cartilage tissue by supplying a first drive signal with a first frequency in an audible range to the vibrator, and apply vibration from the vibrator which stimulates the ear acupuncture point by supplying a second drive signal with a second frequency lower than the first frequency to the vibrator.

7. The hearing device according to claim 6, wherein the second frequency is an inaudible low frequency of 20 Hz or less.

8. The hearing device according to claim 6, wherein the drive unit is configured to alternately supply the first drive signal and the second drive signal to the vibrator.

9. The hearing device according to claim 6, wherein the drive unit is configured to simultaneously supply the first drive signal and the second drive signal to the vibrator.

10. A hearing device comprising:

a vibrator configured to be attached in contact with an epidermis of an auricle; and a drive unit configured to drive and vibrate the vibrator, wherein the vibrator is configured to transmit sound to an inner ear and stimulate an ear acupuncture point by applying vibration to cartilage tissue surrounding an external auditory meatus, and the vibrator includes:

a first vibrator configured to be attached in contact with the epidermis of the auricle and to apply vibration for transmitting audible sound to the cartilage tissue by vibrating at a first frequency in an audible range, and a second vibrator configured to be attached in contact with the epidermis and to apply vibration for stimulating the ear acupuncture point by vibrating at a second frequency lower than the first frequency.

11. The hearing device according to claim 10, further comprising:

a coupler connected to the first vibrator and the second vibrator, wherein the coupler maintains a state in which one of the first vibrator and the second vibrator is attached to a tragus or a rear of auricle and the other is attached in a cavum conchae.

* * * * *